Figure 1:
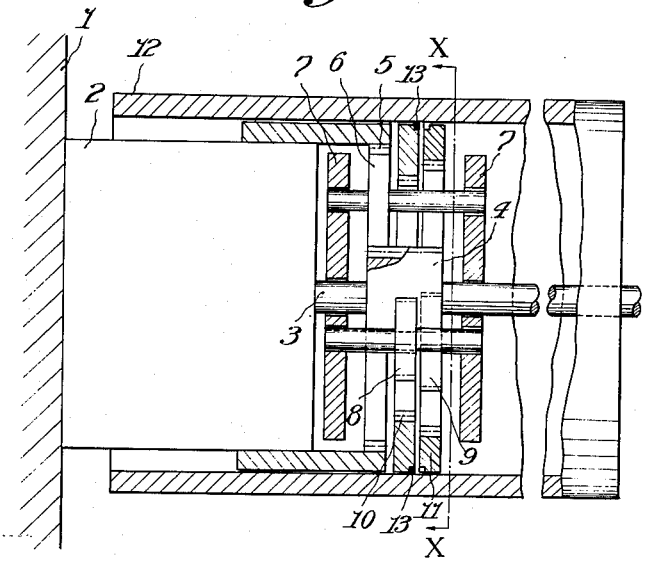

Sept. 7, 1965  KINICHIRO FURUKAWA ET AL  3,204,489
CHART DRIVING MECHANISM FOR RECORDERS
Filed Jan. 28, 1963

United States Patent Office 3,204,489
Patented Sept. 7, 1965

3,204,489
CHART DRIVING MECHANISM FOR RECORDERS
Kinichiro Furukawa, Nakano-ku, Tokyo-to, and Masaharu Nishimura, Musashino-shi, Japan, assignors to Kabushiki Kaisha Hitachi Seisakusho, Tokyo-to, Japan, a joint-stock company of Japan
Filed Jan. 28, 1963, Ser. No. 254,261
Claims priority, application Japan, Jan. 26, 1962, 37/2,852
1 Claim. (Cl. 74—785)

The present invention relates to recorders and improvements of interior construction thereof, and more particularly it relates to a novel chart driving mechanism for automatic recorders.

Heretofore, the chart driving platen, the synchronous motor for driving the said platen, and the speed reduction mechanism disposed therebetween have constituted the chart driving mechanism as individual recorder parts.

It is an object of the present invention to provide a new chart driving system wherein, by functionally combining the above-stated individual recorder parts, these parts are functionalized, whereby the occupied space within recorders may be fully utilized, and miniaturization may be realized.

The foregoing object has been achieved by the present invention, which briefly described, contemplates utilizing, for its speed reduction mechanism, a differential mechanism in which a planetary gear system is used, whereby a high reduction ratio is readily obtainable, and the entire chart driving mechanism, including the synchronous motor, is installed completely within the chart driving platen, thereby, utilizing space never used hereinbefore.

Figure 2:
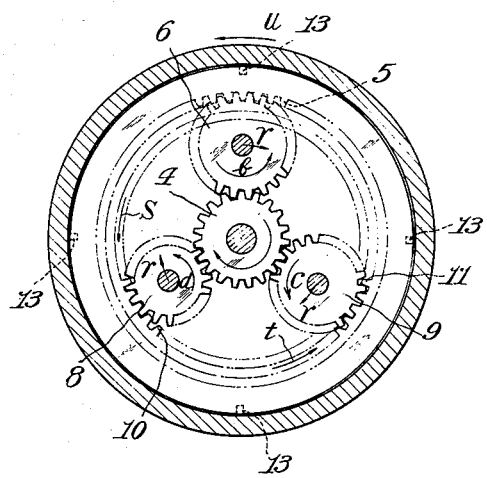

The nature and details of the invention will be more clearly apparent by reference to the following description of a preferred embodiment thereof, taken in conjunction with the accompanying drawing in which like parts are designated by like reference numerals, and in which:

FIGURE 1 is an elevational view, in vertical section, with certain parts cut and shortened, showing the embodiment; and FIGURE 2 is a sectional view taken along the line X—X of FIGURE 1.

Referring to the drawing, which shows an embodiment of the chart driving mechanism, reference numeral 1 designates the recorder frame to which is secured a synchronous motor 2 having a motor shaft 3. This motor shaft 3 transmits driving power from the synchronous motor 2 to a chart feeding roll or platen 12 through a differential mechanism comprising a sun gear 4 fixed to and rotating with the motor shaft 3, a stationary internal gear 5 fixed to the outer frame of the synchronous motor 2, a planet gear 6 meshed with both gears 4 and 5, planet gears 8 and 9 meshed with the sun gear 4, a disk 7 which is supported in a freely rotatable manner on the motor shaft 3, and which supports the shafts of the planet gears 6, 8, and 9, which are thus supported in a freely rotatable manner relative to the disk 7, internal gears 10 and 11 meshed with the planet gears 8 and 9, respectively, and pins 13, fastened to platen 12, for transmitting the rotation of either of the internal gears 10 and 11 to the platen 12, which is supported rotatably by means not shown in a concentric disposition relative to internal gears 10 and 11. In the drawing, the case wherein the pins 13 are coupling the internal gear 10 to the platen 12 is illustrated.

The switching operation of pins 13 enmeshed with the internal gear 10 or 11 can be accomplished by such conventional means as a mechanical or an electromagnetical clutch. Referring to FIG. 1, for instance, a rod may be inserted between platen 12 and the internal gear 5 from the outside, whereby either the gear 10 or 11 may be moved and meshed with pins 13. Or else, by sliding the platen 12 in axial direction with respect to the internal gear 10 or 11 by appropriate means, the pins 13 and the internal gear 10 or 11 may be selectively enmeshed.

The chart driving mechanism according to this invention as described above has the following operation. When the motor 2 is started, and the sun gear 4 is rotated in the direction of the arrow as shown in FIGURE 2, the planet gears 6, 8, and 9, which are meshed with the gear 4, rotate in their respective directions indicated by arrows $b$, $c$, and $d$. However, since especially the planet gear 6 is meshed also with the stationary internal gear 5, it is forced to roll along the inner surface of this internal gear 5 in the direction of the arrow $r$. Consequently, the other planet gears 8 and 9, which are supported on the common disk 7 together with the planet gear 6, are also caused to undergo revolution in the $r$ direction. The rotational velocities of the internal gears 10 and 11, which are rotated in the arrow directions S and $t$, respectively, by the planet gears 8 and 9 undergoing this revolutional motion, are subtracted by the revolutional component, whereby extremely large reductions are accomplished. By providing the numbers of teeth on these internal gears 10 and 11 with a suitable difference, and by providing means, such as the pins 13 of the above-described embodiment, to selectively couple either of the internal gears 10 and 11 to the chart feeding platen 12 so as to drive this platen in rotation, it is possible to obtain two stages of rotational speed ratios for the platen 12. It will be obvious that, by increasing the number of pairs of planet gears and respective internal gears enmeshed therewith, and providing these pairs with different gear ratios, speed changing with even a greater number of stages can be obtained.

It is to be observed that the present invention provides a chart driving mechanism wherein, as described above, a differential mechanism in which planetary gears are used is utilized as the reduction mechanism, whereby a high reduction ratio is readily obtainable, and, moreover, it is constructionally possible to install the entire mechanism, including the synchronous motor, within the hollow interior of the chart feeding platen. Accordingly, the entire chart driving mechanism is functionalized and becomes miniature in size. The significant advantage of the constructional arrangement of this invention resides in the fact that the space occupied by the mechanism of this invention is the interior of the chart feeding platen which has never been utilized in conventional recorders, as far as the present investors are aware. Accordingly, the present invention affords substantial miniaturization of recorders and like instruments.

Although the present invention has been described in conjunction with a preferred embodiment thereof, it is to be understood that modifications and variations may be resorted to therein without departing from the spirit and scope of the invention, as those skilled in the art will readily understand, and such modifications and variations are considered to be within the purview and scope of the invention and appended claim.

What is claimed is:

In a chart driving mechanism for recorders having a chart feeding platen in the form of a hollow cylinder, a synchronous motor and a speed reduction mechanism for receiving motion from said motor, the improvement which comprises a differential speed reduction mechanism suitable for miniaturization disposed within said platen and composed of a sun gear disposed on, and rotating with, the shaft of said motor; a stationary first internal gear fixed to the outer frame of said motor; a first planetary gear meshing with said sun gear and said first internal gear; a second and a third planetary gear meshing with said sun gear; a disk disposed freely rotatably on said motor shaft and supporting the shafts of said first, second and third planetary gears, respectively; a second and a third internal gear meshing with said second and third planetary gears, respectively; and a plurality of pins transmitting the rotation of said second and third internal gears to said platen; said platen being disposed rotatably and concentrically relative to said second and third internal gears.

References Cited by the Examiner
UNITED STATES PATENTS

| | | |
|---|---|---|
| 1,313,537 | 8/19 | Jones. |
| 2,997,608 | 8/61 | Musser. |
| 3,122,945 | 3/64 | Chung _____ 198—203 |

DON A. WAITE, *Primary Examiner.*